Feb. 22, 1949. J. M. GOLDBERG 2,462,261
MOVING PICTURE FILM REEL
Filed June 11, 1945

INVENTOR.
JACOB M. GOLDBERG
BY
Martin E. Anderson
ATTORNEY.

Patented Feb. 22, 1949

2,462,261

UNITED STATES PATENT OFFICE 2,462,261

MOVING PICTURE FILM REEL

Jacob M. Goldberg, Denver, Colo.

Application June 11, 1945, Serial No. 598,747

2 Claims. (Cl. 242—74)

This invention relates to improvements in reels for moving picture film and the like. Moving picture films are, as is well known, stored, shipped and handled, wound on reels. The reels are also used in connection with projection machines, the film being unwound from one and wound onto another reel. After each exhibition, the film must be rewound so as to make the same end available for the next exhibition.

In winding a film onto a reel the end must be attached to the reel to prevent it from slipping. Reels have been provided with various means for attaching or anchoring the end of the film. Reels have, for example, been provided with spring tongues for engaging the edges of the film to exert a gentle pressure against them, which produces sufficient resistance to prevent the film from slipping during the initial few turns. Some reels have the hub provided with transverse slits into which the end of the film is inserted.

It is the object of this invention to produce a moving picture film reel of a very simple and highly substantial construction which shall be provided with means for anchoring the first turns of film in such a way that the film will readily release when it is unwound.

The above objects and any others that may appear as the description proceeds are attained by means of a construction and an arrangement of parts that will now be described in detail and reference for this purpose will be had to the accompanying drawing where the invention has been illustrated, and in which.

Figure 1:
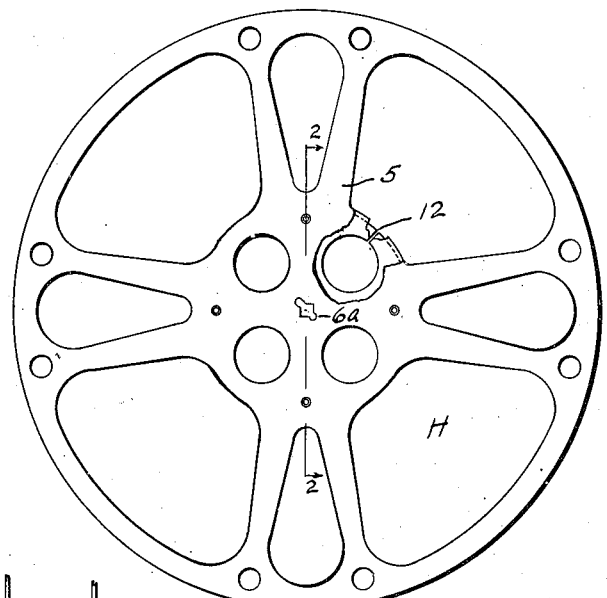
Figure 1 is a side elevation of a reel embodying the invention, portions thereof being broken away to better disclose the construction.
Figure 2:
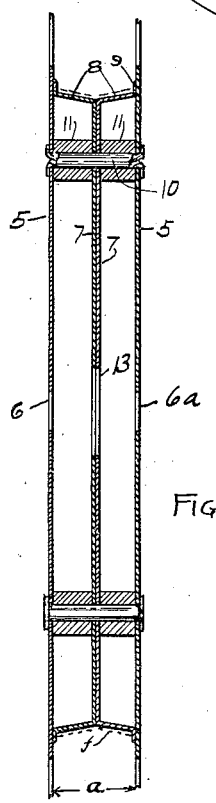
Figure 2 is a section taken on line 2—2, Figure 1, showing a 16 millimeter reel.
Figure 3:
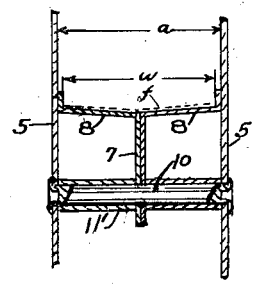
Figure 3 is a fragmentary section similar to that shown in Figure 2, and shows the parts to a scale suitable for a 35 millimeter film.

The reel comprises two sides 5 of identical size and shape, with this exception, that one has a round central hole 6 and the other a noncircular hole 6a as shown in Figures 1 and 2. The sides are spaced by a hub which consists of two parts of identical size and shape. Each hub part consists of a flat plate 7 whose outer edge has been formed by a suitable die or by spinning, with a slightly frusto-conical surface 8 whose outer edge terminates in a continuous narrow flat flange 9 whose depth is equal to two or three thicknesses of film. The two hub parts are arranged in opposed relation as shown in Figures 2 and 3 and are provided with a plurality of angularly spaced holes for the reception of rivets 10. The sides 5 are positioned against the outer surfaces of flanges 9 and are connected rigidly with the hub by means of the rivets. Tubular spacers 11 and 11' surround the rivet on opposite sides of the hub centers 7 and hold the sides against the rivet heads.

The distance $a$ between the inside surfaces of the sides is slightly greater than the width of the film to be wound thereon and the distance $w$ between the inside surfaces of the flanges is slightly less than the width of the film.

The flanges are continuous and lie in a flat plane. By the use of continuous flanges instead of narrow tongues, the danger of accidently bending the flanges inwardly is greatly decreased as compared to a construction employing narrow tongues. Another advantage of continuous flanges is that the operator does not have to select any particular place to secure the film end, whereas when tongues are used, the film must be pressed inwardly in line with the tongues.

It is evident that when a film is wound onto the reel and into contact with the hub surfaces 8, it must be bent transversely and assume the shape shown by dotted lines and indicated by reference character $f$. The hub is made transversely concave to allow the film to be pressed into position between flanges 9. The transverse curvature of the hub should be such that the curved distance equals the width of the film. The tendency of the film to straighten presses the edges against the inside of the flanges and holds the film from slipping on the hub during the initial turns of the winding.

The end of the film is fastened by pressing the film into the dotted line position. The sides have holes H to permit the operator to press the film into position.

When the film is unwound it will release without causing any injury to the edges as the parts are so proportioned that the binding action is merely sufficient to hold the film from sliding when the winding is commenced.

In addition to the outwardly turned flange 9, the hub is also provided with four slits 12 into which the end of the film may be inserted. Due to the transversely concave construction, the film can be positioned directly against the outer surface of the hub and danger of exerting too great a pressure on the film edges is avoided.

The anchoring of the film can be accomplished with surfaces 8 cylindrical, but in that case the edges of the film will remain slightly spaced from the hub.

It is evident that the flanges 9 may be spot welded to the sides 5, if desired. The holes 13, in parts 7, may be increased to any size desired. The inner corners of the outer peripheral edges of the sides are curved or beveled to facilitate the insertion of the film.

Having described the invention what is claimed as new is:

1. A reel for moving picture films, comprising, two circular sides, and a substantially cylindrical hub formed from two identical parts, each part having a central portion and an outwardly extending continuous flat flange connected therewith by means of an outwardly flaring frustoconical surface, the hub members having the central portions in contact, means for securing the hub members and the sides to each other with the sides in contact with the flanges of the hub, comprising rivets extending through the center portion of the hub and through the sides, whereby a unitary reel assembly is formed, the distance between the outer surfaces of the flanges being slightly greater than the width of the film to be wound thereon and the distance between their inner surfaces being slightly less than the width of the film.

2. A reel for moving picture films, comprising, two circular sides, and a substantially cylindrical hub formed from two identical parts, each part having a central portion and an outwardly extending continuous flat flange connected therewith by means of an outwardly flaring frustoconical surface, the hub members having the central portions in contact, means for securing the two hub members and the two sides to each other in predetermined spaced relation, the distance between the outer surfaces of the flanges being slightly greater than the width of the film to be wound thereon and the distance between their inner surfaces being slightly less than the width of the film.

JACOB M. GOLDBERG.

REFERENCES CITED

The following references are of record in the file of this patent:

UNITED STATES PATENTS

| Number | Name | Date |
| --- | --- | --- |
| 1,311,689 | Hagerstrom | July 29, 1919 |
| 1,593,012 | Bryant | July 20, 1926 |
| 1,939,816 | Hornbuckle | Dec. 19, 1933 |
| 2,226,825 | McAuley | Dec. 31, 1940 |
| 2,392,492 | Morgan | Jan. 8, 1946 |

FOREIGN PATENTS

| Number | Country | Date |
| --- | --- | --- |
| 19,911 | Australia | Oct. 8, 1929 |